Patented Apr. 30, 1940

2,198,886

UNITED STATES PATENT OFFICE 2,198,886

MOISTUREPROOFING OF REGENERATED CELLULOSE

Charles Forbes Silsby, White Plains, N. Y., assignor to The Solvay Process Company, Syracuse, N. Y., a corporation of New York No Drawing. Application August 16, 1937, Serial No. 159,436

4 Claims. (Cl. 91—68)

This invention relates to moistureproof materials and a method of making the same. More particularly it relates to moistureproof sheets or films of regenerated cellulose and to a method of making the same.

Sheets or films of regenerated cellulose are ordinarily rendered impermeable to the passage of substantial amounts of moisture by coating them with a cellulose ester lacquer, such as one containing cellulose nitrate, a wax, a plasticizer, and a blending agent dissolved in a suitable solvent. After the application of the lacquer, the sheets are maintained at an elevated temperature to evaporate the solvent and produce uniform and moistureproof coatings thereon. The above procedure has, however, the disadvantage that it must be carefully controlled, especially with regard to the relative amounts of the various ingredients used, in order that transparent, flexible, and non-tacky products may be obtained.

It is an object of this invention to provide wrapping materials comprising sheets or films of regenerated cellulose coated with a moistureproofing composition.

It is another object of this invention to provide a process for the production of moistureproof, transparent, flexible, and non-tacky sheets or films of regenerated cellulose.

It is a further object of this invention to produce sheets having the above characteristics by a process that is relatively simple and easy to control.

Other objects of this invention will be obvious from the detailed disclosure thereof.

It has been discovered in accordance with this invention, sheets or films of regenerated cellulose may be rendered impermeable to the passage of substantial amounts of moisture by coating them with thin layers of a succinic acid-glycerol resin. The resin coatings may be formed on the sheets by applying the resin in a molten condition thereto, and permitting the resin to harden so as to form coatings of uniform thickness. Or the sheets may be coated with a solution of the resin and the solvent evaporated so as to form uniform and moistureproof coatings thereon. If desired, plasticizers such as triphenyl phosphate, tricresyl phosphate, diethyl phthalate, dibutyl phthalate, etc., may be admixed with the resin to improve the flexibility of the coated sheets. Sheets of regenerated cellulose coated by either of the above methods are not only transparent, flexible, non-tacky, and colorless, but have moistureproof qualities equal to commercial moistureproof sheets of regenerated cellulose now on the market.

To prepare the succinic acid-glycerol resin which is to be used in accordance with this invention, approximately 2 parts by weight of succinic acid may be reacted with approximately 1 part by weight of glycerol at an elevated temperature until a sample of the mass when allowed to cool becomes viscous and tenacious, but not sticky. If the reaction is permitted to proceed for too long a time, the resulting resin may be infusible, and thus unsuitable for the purposes of this invention. The relative amounts of succinic acid and glycerol may be varied somewhat from the above proportions, but it has been found that it is not desirable to vary the amounts of these ingredients too widely inasmuch as a substantially greater proportion of acid renders the ultimate product too hard and a substantially greater proportion of glycerol renders the final product too sticky. The reaction will take place readily at temperatures of 200° C. to 220° C. The time necessary to produce the resin used according to this invention is dependent somewhat upon the temperature at which the reaction is conducted and also upon the amount of materials being reacted, and may vary from 15 minutes to 3 hours or more.

The resin produced as described above is then applied either in a molten condition or dissolved in a suitable solvent to ordinary sheets or films of regenerated cellulose. Inasmuch as the resin used according to this invention is easily fusible, suitable coatings of this resin may be produced upon sheets or films of regenerated cellulose by drawing them through a suitable receptacle containing a molten mass of the resin, to which may be added a plasticizer, such as dibutyl phthalate, if desired. The thickness of the coatings may be controlled by suitable doctor blades disposed above the receptacle in which the coating treatment is conducted. After the coatings have been applied and the thicknesses thereof adjusted, they are permitted to harden to produce uniform films upon the sheets. After the coating process, the resin may be further polymerized, if desired, by further heating, but the success of this invention is not dependent upon the degree of polymerization of the resin. The coated sheets produced according to the above treatment are moistureproof, transparent, flexible, non-tacky, and colorless, and are eminently suited for wrapping material.

The moistureproof coating may also be produced by immersing sheets or films of regenerated cellulose in a solution of the resin. The resin used according to this invention is soluble in solvents such as acetone, forming a varnish-like composition, which may be applied to said sheets or films in any suitable manner, such as by drawing them through the solution which may contain a plasticizer such as dibutyl phthalate, if desired. Uniform layers of varnish are thus produced on both sides of the sheets, the thickness of which depends somewhat on the time of immersion in the solution. After the sheets are withdrawn from the solution, the solvent is evaporated in any suitable manner, such as by passing the coated sheets through a drying tower. It may be desirable to subject such coatings after evaporation of the solvent to elevated temperatures, preferably above melting point of the resin, so that any pores or interstices left in the coatings by the evaporation of the solvent may be removed. During the evaporation of the solvent from the sheets, the resin may be transformed into one which is partially or completely insoluble and infusible. Such transformation may also be effected, if desired, by heating the coatings in situ after the evaporation of the solvent. Sheets coated in this way will exhibit excellent moistureproof properties and will be transparent, flexible and non-tacky; hence are well suited for wrapping materials.

The following examples are illustrative of this invention:

*Example I.*—2 parts by weight of succinic acid and 1 part by weight of glycerol are heated at a temperature of 200–220° C. for a period of 2 hours. The resulting mass, while still molten, is applied to an ordinary sheet of regenerated cellulose by drawing said sheet through the molten material, after which the coating is allowed to solidify. The sheet of regenerated cellulose with this coating thereupon will show moistureproof qualities equal to those of commercial moistureproof sheets of regenerated cellulose.

*Example II.*—2 parts by weight of succinic acid and 1 part by weight of glycerol are reacted at a temperature of 200–220° C. for a period of 2 hours and the resulting product is then dissolved in acetone. An ordinary sheet of regenerated cellulose is drawn through this solution thereby coating both sides of the sheet. The sheet is then withdrawn from the bath and the solvent evaporated from the coating by passing the sheet through a heated chamber. The sheet of regenerated cellulose so coated will show moistureproof qualities equal to those of commercial moistureproof sheets of regenerated cellulose.

It is seen from the above description that by this invention sheets or films of regenerated cellulose may be rendered moistureproof without impairing their desirable qualities of transparency and flexibility. Furthermore, because of the inherent toughness and flexibility of succinic acid-glycerol resins, sheets of regenerated cellulose coated with such resins not only become moistureproof, but also become substantially more resistant to tearing while retaining their desirable flexibility, thus enhancing their value as wrapping materials. In addition, such sheets are produced according to this invention by a process which does not require careful control of the relative amounts of the ingredients making up the moistureproofing composition, but which merely involves the application of a resin to the sheets, thereby effecting simplicity in operation and a saving in labor and material. Finally, moistureproof sheets of regenerated cellulose produced according to this invention have no undesirable odor, feel, or color, but are transparent, odorless, colorless, and non-tacky, and thus are extremely suitable for wrapping such articles as tobacco products, cakes, and candy which tend to be damaged or otherwise detrimentally affected by substantial gains or losses of moisture.

In place of or in conjunction with glycerol, other polyhydric alcohols, such as ethylene glycol, may be used in the practice of this invention.

I claim:

1. The method of moistureproofing sheets or films of regenerated cellulose which comprises applying to the surfaces of said sheets a fusible succinic acid-glycerol resin formed by reacting about two parts of succinic acid and about one part of glycerol.

2. The method of moistureproofing sheets or films of regenerated cellulose which comprises applying to the surfaces of said sheets a solution of a fusible succinic acid-glycerol resin formed by reacting about two parts of succinic acid and about one part of glycerol and evaporating the solvent so as to form uniform coatings thereon.

3. The method of moistureproofing sheets or films of regenerated cellulose which comprises applying in a molten condition to the surfaces of said sheets a fusible resin formed by reacting about two parts of succinic acid and about one part of glycerol, so as to form uniform coatings thereon.

4. The method of moistureproofing sheets or films of regenerated cellulose which comprises applying to the surfaces of said sheets a solution in acetone of a fusible resin formed by reacting about two parts of succinic acid and about one part of glycerol and evaporating the solvent so as to form uniform coatings thereon.

CHARLES FORBES SILSBY.